United States Patent [19]

Takeshita et al.

[11] 4,326,413
[45] Apr. 27, 1982

[54] LIQUID-LEVEL GAUGE FOR VEHICLES

[75] Inventors: Mikio Takeshita, Toyota; Hiroyuki Tashiro, Kariya, both of Japan

[73] Assignee: Nippondenso Co., Ltd., Kariya, Japan

[21] Appl. No.: 115,665

[22] Filed: Jan. 28, 1980

[30] Foreign Application Priority Data

Mar. 13, 1979 [JP] Japan .................. 54/31848[U]

[51] Int. Cl.³ .................................. G01F 23/10
[52] U.S. Cl. .................................. 73/313; 73/317; 324/154 PB
[58] Field of Search .................. 73/317, 313, 308; 116/229, 328, 330, 332; 324/154 PB; 340/625, 688, 870.09

[56] References Cited

U.S. PATENT DOCUMENTS 2,388,559 11/1945 Macintyre .................. 73/313
2,902,683 9/1959 Wheeler .................. 340/625 X
3,052,841 9/1962 Vanderberg .................. 73/313 X
3,208,059 9/1965 Ziegler .................. 73/313 X
4,178,802 12/1979 Yamamoto .................. 73/313

FOREIGN PATENT DOCUMENTS 52-47277 12/1977 Japan.
480391 2/1938 United Kingdom .................. 73/313

*Primary Examiner*—Kyle L. Howell
*Assistant Examiner*—Joseph W. Roskos
*Attorney, Agent, or Firm*—Cushman, Darby & Cushman

[57] ABSTRACT

A liquid-level gauge includes an indicator for indicating an amount of fuel corresponding to a liquid level of the fuel detected by a liquid level detector mounted within a fuel tank of a vehicle. The indicator used is of the leaving pointer type in which a pointer keeps pointing a value immediately before a power supply is shut off. The energization of the indicator continues for a given time enough to complete the pointing operation when a power source switch has been turned on and then is interrupted intermittently.

4 Claims, 4 Drawing Figures

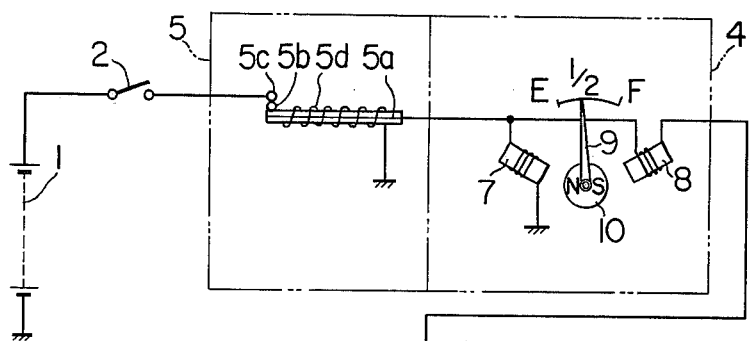
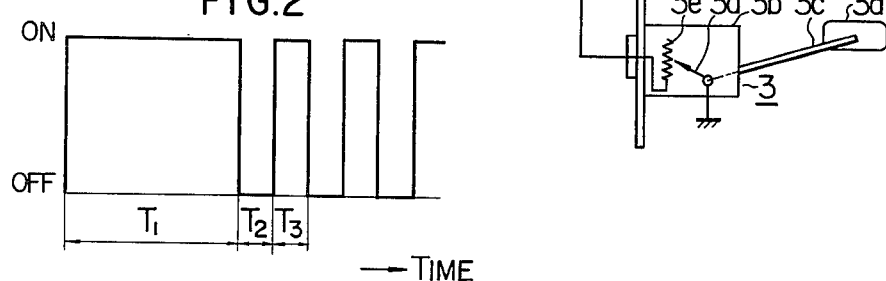
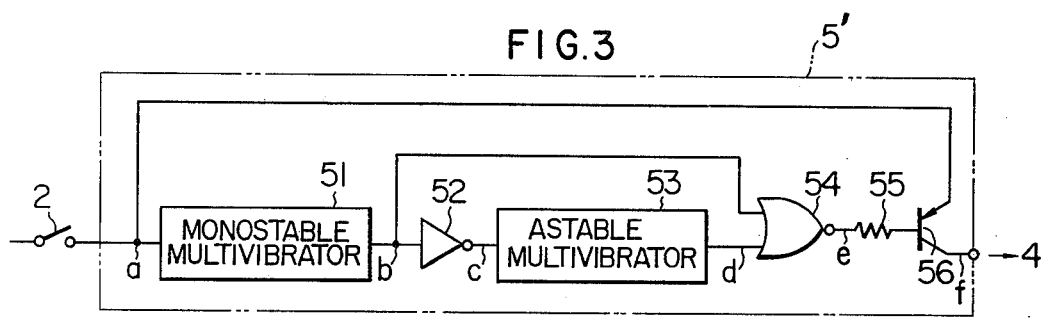
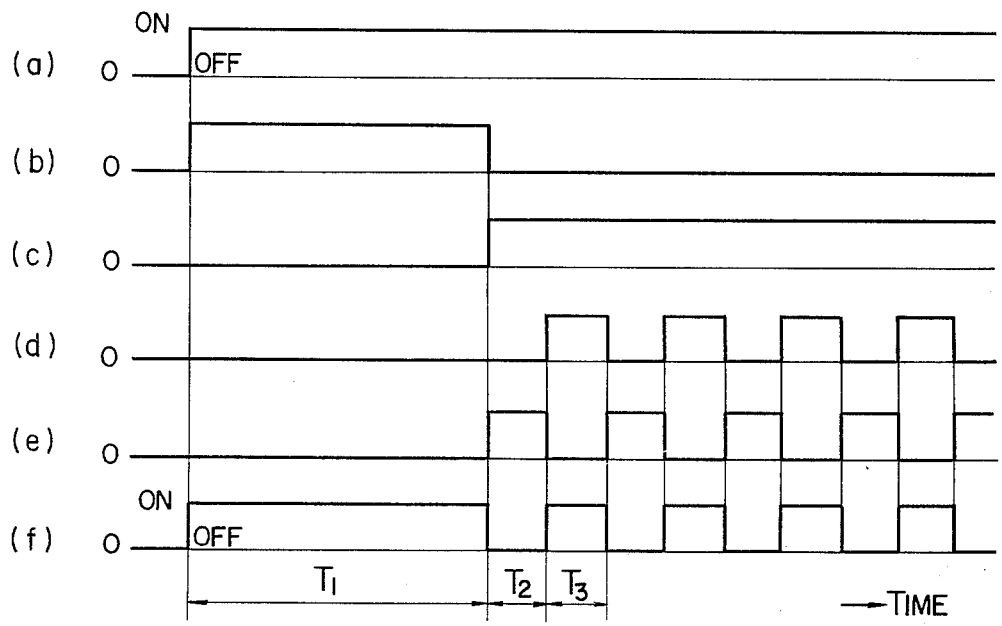

LIQUID-LEVEL GAUGE FOR VEHICLES

BACKGROUND OF THE INVENTION

The invention relates to a liquid-level gauge and, more particularly to a liquid-level gauge which detects a liquid level in a fuel tank of a vehicle such as an automobile and indicates the level detected.

One of the conventional liquid-level gauges of this type has a liquid-level detector including a resistor with its resistance changing with a change in the liquid level and a liquid-level indicator for indicating a liquid level in accordance with the resistance in the liquid-level detector.

The liquid level of the fuel tank gauge is susceptible to the running conditions of a vehicle. Particularly, when a vehicle is quickly turned, the liquid level greatly changes due to the centrifugal force, vibrations and the like. With the change of the liquid level, the resistance value of the liquid-level detector changes and in turn the liquid-level indicator changes its indication. In this case, the liquid-level indicator accordingly indicates an erroneous indication incorrectly representing an amount of the residual fuel.

An approach to solve this problem is disclosed in Japanese Utility Model No. 53472/'77 (52 of Showa) issued on Dec. 5, 1977. This approach employs an inclination sensor, as an acceleration sensor, for sensing an inclination of the liquid level. When the sensor senses an inclination of the liquid level, an electromagnet is energized to drive a stopper thereby to stop a needle of a liquid-level indicator of the ratio type. In this way, when the liquid level inclines, the liquid-level indicator points to the liquid level before it inclines. This approach requires not only the inclination sensor, but also the electromagnet and the stopper which are associated with the liquid-level indicator. This makes the structure of the liquid-level indicator complicated.

SUMMARY OF THE INVENTION

Accordingly, an object of the invention is to provide a liquid-level gauge for a vehicle which is simple in structure, and almost insensitive to rapid start, sudden stop, quick turning of the vehicle and the like.

The above object is preferably achieved by the combination of a ratio type liquid-level indicator of leaving pointer type and a timer circuit to turn on and off at given intervals a power source of a liquid-level indicator.

To enhance the initial indication characteristic of the liquid-level indicator, the timer circuit has a relatively long initial conduction time enough to provide a correct indication by the liquid-level indicator, and turn-on and off periods of the power source which are set in accordance with a running pattern of a vehicle.

BRIEF DESCRIPTION OF THE DRAWINGS

FIG. 1 shows a schematic circuit diagram of an embodiment of a liquid-level gauge for vehicles according to the invention;

FIG. 2 shows a set of waveforms useful in explaining the operation of a timer circuit 5 used in the circuit shown in FIG. 1;

FIG. 3 shows a circuit diagram of another embodiment of the timer circuit 5 applied for the device shown in FIG. 1; and FIG. 4 shows waveforms for illustrating the operation of the circuit shown in FIG. 3.

DESCRIPTION OF THE PREFERRED EMBODIMENTS

Referring now to FIG. 1 illustrating a first embodiment of a liquid-level gauge for vehicles according to the invention, reference numberal 1 designates a power source; reference numeral 2 a key switch as a power source switch; reference numeral 3 a liquid-level detector mounted within a fuel tank of a vehicle. The liquid-level detector 3 has a float 3a moving with a liquid level, an arm 3c which is fixed at one end to the float 3a and rotatably mounted at the other end to a detector body 3b, a sliding member 3d fixed to the center about which the arm 3c rotates, and a resistor member 3e on and along which the sliding member 3d slides. The sliding member 3d is grounded to the vehicle body, through the detector body 3b. A ratio type liquid-level indicator of leaving pointer type used as a cross-coil and moving magnet type instrument is comprised of two cross-coils 7 and 8, a needle or pointer 9, and a circular permanent magnet 10 coupled with the pointer 9. A resultant electromotive force developed by the two coils 7 and 8 rotates the permanent magnet 10 to point a liquid level, or an amount of residual fuel by the pointer 9. The weights of the permanent magnet 10 and the pointer 9 are so proportionally distributed and balanced that, when electric power to both the coils are shut off, the permanent magnet 10 and the pointer 9 are left at a position immediately before the power shut-off occurs. Therefore, the pointer 9 keeps indicating an amount of the residual fuel in the fuel tank immediately before the power shut-off. A timer circuit 5 interrupts the power supply from the power source 1 to the liquid-level indicator 4 at given intervals, after the key switch 2 is turned on. The timer cirucit 5 may be a bimetal switch including a bimetal strip 5a, a movable contact 5b fixed to the tip of the bimetal strip 5a, a normally-closing fixed contact 5c with which the movable contact 5b contacts normally, and a heating wire 5d for heating the bimetal strip 5a, which is connected at one end to the bimetal strip 5a and at the other end to the ground. The power source 1 is connected at the negative side to the vehicle body as the ground and at the positive side to the fixed contact 5c. The movable contact 5b is coupled to one end of each of the two coils 7 and 8, through the bimetal strip 5a. The coil 7 is grounded at the other end. The other end of the coil 8 is connected to one end of the resistor member 3e.

The operation of the liquid-level gauge as described above will be explained. The key switch 2 is turned on, firstly. At the initial stage, the movable contact 5b of the timer circuit 5 is in contact with the fixed contact 5c. Power is accordingly supplied from the power source 1 to the liquid-level indicator 4. The pointer 9 of the indicator points the fuel amount corresponding to a resistance of the liquid-level detector 3 which changes with the liquid level. At the same time, power is supplied to the heating wire 5d of the timer circuit 5. The heating wire 5d is heated to heat the bimetal strip 5a satisfactorily, so that the bimetal strip 5a is bent to separate the movable contact 5b from the fixed contact 5e after time $T_1$ shown in FIG. 2. By the separation of those contacts, the liquid-level indicator 4 is deenergized to cause the pointer 9 to keep indicating the fuel amount immediately before the deenergization. The time $T_1$ is so selected to have a length, e.g., 45 to 60 seconds, sufficient to allow the pointer 9 of the liquid-level indicator 4 to indicate the detected liquid level satisfactorily.

As the heating of the bimetal strip 5a ceases as a result of the deenergization of the heating wire 5d, the temperature of the bimetal strip 5a falls and the movable contact 5b comes in contact with the fixed contact 5c after time $T_1$, for example, 15 to 20 seconds, shown in FIG. 2 which is shorter than time $T_1$. Consequently, the energization of the liquid-level indicator 4 restarts, so that the pointer 9 of the indicator 4 indicates the fuel amount corresponding to a resistance value of the detector 3 which varies with the liquid level. Under this condition, the heating wire 5d heats the bimetal strip 5a again. At this time, the temperature of the bimetal strip 5a is sufficiently higher than the ambient temperature because it has been heated at the previous heating operation. After time $T_3$, shown in FIG. 2 shorter than time $T_1$, the movable contact 5b is separated from the fixed contact 5c. Subsequently, the power supply to the liquid level of the indicator 4 is turned on and off with the periods $T_2$ and $T_3$, repeatedly. Even if the resistance value of the liquid-level detector 3 temporarily changes due to the rapid start, the sudden stop, the quick turning of the vehicle, the power supply to the detector 4 accordingly is interrupted intermittently with the given intervals and the variations of the value pointed by the pointer of the indicator is lessened due to the interrupting times of the power supply. The reason why an accurate indication can be obtained by interrupting the energization of the indicator 4 is based on the fact that a value such as the amount of the fuel never rapidly changes, generally.

Also, when the key switch 2 is turned off for stopping the vehicle engine, the coils 7 and 8 of the liquid-level detector 4 are deenergized, so that the indicator keeps indicating the amount of the fuel just before the interruption of the energization.

FIG. 3 shows another embodiment of the timer circuit 5 applied for the device shown in FIG. 1. In the timer circuit 5', a monostable multivibrator 51 connected to the key switch 2 produces a high level signal with a given time width $T_1$ as shown in FIG. 4(b) when the switch 2 is turned on and it has an input voltage applied thereto as shown in FIG. 4(a). An inverter 52 inverts the output signal of the monostable multivibrator 51 to produce an output signal of which the level becomes high after time $T_1$, as shown in FIG. 4(c). An astable multivibrator 53 alternately produces high and low level signals in periods $T_2$ and $T_3$, as shown in FIG. 4(d), when the output signal of the inverter 52 becomes high in level. A NOR circuit 54 NORs the output signals from both the multivibrators 58 and 51 to produce an output signal as shown in FIG. 4(e). A transistor 56 is corrected at the base to the output of the NOR 54 through a resistor 55, at the emitter to the key switch 2, and at the collector to both the coils 7 and 8 of the liquid-level detector 4. After the key switch 2 is turned on, electric power is supplied to the transistor 56 for time $T_1$, as shown in FIG. 4(f), so that an output signal to turn on and off the power supply with repetitive periods $T_2$ and $T_3$, appears at the collector of the transistor 56.

The ratio type liquid-level indicator 4 used in the device according to the invention is not limited to the above-mentioned one, but it may be any other suitable indicator, for example, an indicator using a plurality of coils assembled into a bridge circuit as its components.

We claim:
1. A liquid-level gauge for vehicles comprising:
   a container for containing liquid provided within a vehicle;
   a detector mounted to said container for producing a detected signal corresponding to a liquid level of the liquid;
   an indicator connected to said detector for indicating a liquid level value by a pointer in response to the detected signal derived from said detector, said indicator including a reference magnetic field generating coil, a variable magnetic field generating coil and a moving magnet, and said indicator being of leaving pointer type in which, when said coils are deenergized, an indication of said pointer rotated by said moving magnet is held at a value just before the deenergization; and
   a timer circuit connected to said indicator and a power source through a power source switch, which permits electric power to intermittently pass through said switch to said coils of said liquid level indicator with given intervals, after the power source switch is turned on.

2. A liquid-level gauge according to claim 1 wherein said timer circuit continuously supplies electric power to said coils of said indicator for a longer period than the power supply period in the intermittent power supply cycle, immediately after said power source switch has been turned on.

3. A liquid-level gauge for indicating a liquid level in a liquid container comprising:
   a source of electric power, connected to a power switch;
   a variable resistor changing the resistance thereof in accordance with a liquid level in a liquid container;
   a first magnetic field generating coil for generating, when energized by said electric power source, a first magnetic field;
   a second magnetic field generating coil connected in series with said variable resistor for generating, when energized by said electric power source, a second magnetic field, said second magnetic field being variable in dependence on the resistance of said variable resistor;
   a rotary magnet rotated by the first and second magnetic fields;
   a pointer associated with said rotary magnet for indicating the liquid level in said liquid container; and
   switching means connected in series with said electric power source, said power switch and said first and second coils for automatically controlling the alternate energization and deenergization of said first and second coils during the closure of said power switch.

4. A liquid-level gauge according to claim 3, wherein said switching means is adapted to connect said electric power source to said first and second coils for a predetermined interval of time in response to the initiation of the closure of said power switch and thereafter alternately connect and disconnect said electric power source to and from said first and second coils at every predetermined interval shorter than said first predetermined interval.

* * * * *